(12) United States Patent  (10) Patent No.: US 8,452,228 B2
Haughay, Jr. et al.  (45) Date of Patent: May 28, 2013

(54) SYSTEMS, METHODS, AND DEVICES FOR ASSOCIATING A CONTACT IDENTIFIER WITH A BROADCAST SOURCE

(75) Inventors: Allen P. Haughay, Jr., San Jose, CA (US); Ryan Perry, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 862 days.

(21) Appl. No.: 12/237,261

(22) Filed: Sep. 24, 2008

(65) Prior Publication Data

US 2010/0075616 A1   Mar. 25, 2010

(51) Int. Cl.
*H04Q 7/20*   (2006.01)

(52) U.S. Cl.
USPC ..... 455/3.04; 455/3.01; 455/3.03; 455/414.1; 455/414.3; 455/426.1; 725/62; 725/63; 725/68; 725/70

(58) Field of Classification Search
USPC ................ 455/3.01–3.06, 422.1, 403, 550.1, 455/426.1, 426.2, 418–420, 73, 412.1, 412.2; 725/62–72
See application file for complete search history.

(56) References Cited

U.S. PATENT DOCUMENTS

| | | | |
|---|---|---|---|
| 4,476,582 A | 10/1984 | Strauss et al. | |
| 5,341,350 A | 8/1994 | Frank et al. | |
| 5,557,541 A | 9/1996 | Schulhof et al. | |
| 5,616,876 A | 4/1997 | Cluts | |
| 5,963,916 A | 10/1999 | Kaplan | |
| 5,983,073 A | 11/1999 | Ditzik | |
| 6,047,054 A | 4/2000 | Bayless et al. | |
| 6,160,551 A | 12/2000 | Naughton et al. | |
| 6,192,340 B1 | 2/2001 | Abecassis | |
| 6,247,130 B1 | 6/2001 | Fritsch | |
| 6,255,961 B1 | 7/2001 | Van Ryzin et al. | |
| 6,259,892 B1 | 7/2001 | Helferich | |
| 6,314,094 B1 | 11/2001 | Boys | |
| 6,338,044 B1 | 1/2002 | Cook et al. | |

(Continued)

FOREIGN PATENT DOCUMENTS

| | | |
|---|---|---|
| EP | 0744839 | 11/1996 |
| EP | 0898378 | 2/1999 |

(Continued)

OTHER PUBLICATIONS

Orubeondo, "Trim AirCard 300 Eases Power Demands." InfoWorld vol. 21, Issue 48, pp. 46 & 50, Nov. 29, 1999.

(Continued)

*Primary Examiner* — Keith Ferguson
(74) *Attorney, Agent, or Firm* — Blakely, Sokoloff, Taylor & Zafman LLP (57) ABSTRACT

A media device including includes a broadcast receiver that receives broadcast media from a plurality of broadcast sources where the broadcast receiver is tunable to a first broadcast source. The media device also includes a data store that stores a list of contact identifiers where each contact identifier is associated with a broadcast source. The media device includes a user interface that: i) provides a prompt to a user to enable the user to initiate contact with the first broadcast source, and ii) receives a user indication to initiate contact with the first broadcast source. The media device further includes a transceiver that initiates the contact with the first broadcast source by sending a communications session request via a communications network to the first broadcast source that includes a contact identifier associated with the first broadcast source.

18 Claims, 10 Drawing Sheets

U.S. PATENT DOCUMENTS

| | | | |
|---|---|---|---|
| 6,339,706 B1 | 1/2002 | Tillgren et al. |
| 6,353,637 B1 | 3/2002 | Mansour et al. |
| 6,401,085 B1 | 6/2002 | Gershman et al. |
| 6,407,750 B1 | 6/2002 | Gioscia et al. |
| 6,408,332 B1 | 6/2002 | Matsumoto et al. |
| 6,418,330 B1 | 7/2002 | Lee |
| 6,487,663 B1 | 11/2002 | Jaisimha et al. |
| 6,510,210 B1 | 1/2003 | Baughan |
| 6,516,466 B1 | 2/2003 | Jackson |
| 6,526,335 B1 | 2/2003 | Treyz et al. |
| 6,559,773 B1 | 5/2003 | Berry |
| 6,587,127 B1 | 7/2003 | Leeke et al. |
| 6,609,105 B2 | 8/2003 | Van Zoest et al. |
| 6,658,247 B1 | 12/2003 | Saito |
| 6,728,531 B1 | 4/2004 | Lee et al. |
| 6,772,212 B1 | 8/2004 | Lau et al. |
| 6,823,225 B1 | 11/2004 | Sass |
| 6,845,398 B1 | 1/2005 | Galensky et al. |
| 6,901,067 B1 | 5/2005 | Kalavade |
| 6,907,112 B1 | 6/2005 | Guedalia et al. |
| 6,915,272 B1 | 7/2005 | Zilliacus et al. |
| 6,917,923 B1 | 7/2005 | Dimenstein |
| 7,065,342 B1 | 6/2006 | Rolf |
| 7,110,714 B1 | 9/2006 | Kay et al. |
| 7,187,947 B1 | 3/2007 | White et al. |
| 7,339,993 B1 | 3/2008 | Brooks et al. |
| 7,440,772 B2 | 10/2008 | White et al. |
| 7,444,353 B1 | 10/2008 | Chen et al. |
| 7,486,926 B2 | 2/2009 | White et al. |
| 7,634,228 B2 | 12/2009 | White et al. |
| 2002/0010759 A1 | 1/2002 | Hitson et al. |
| 2002/0046084 A1 | 4/2002 | Steele et al. |
| 2002/0049037 A1 | 4/2002 | Christensen et al. |
| 2002/0112187 A1 | 8/2002 | Dalton, Jr. et al. |
| 2002/0164973 A1 | 11/2002 | Janik et al. |
| 2002/0183059 A1 | 12/2002 | Noreen et al. |
| 2003/0013425 A1 | 1/2003 | Nee |
| 2004/0198279 A1 | 10/2004 | Anttila et al. |
| 2004/0198389 A1 | 10/2004 | Alcock et al. |
| 2005/0154599 A1* | 7/2005 | Kopra et al. ............ 705/1 |
| 2005/0208913 A1 | 9/2005 | Raisinghani et al. |
| 2006/0105781 A1 | 5/2006 | Ueda et al. |
| 2006/0184431 A1* | 8/2006 | Rosenberg et al. ........ 705/26 |
| 2006/0184960 A1 | 8/2006 | Horton et al. |
| 2007/0208771 A1 | 9/2007 | Platt |
| 2007/0232225 A1 | 10/2007 | Kikuchi |
| 2008/0039037 A1 | 2/2008 | Kum |
| 2008/0133336 A1 | 6/2008 | Altman et al. |
| 2008/0139109 A1 | 6/2008 | Ewertz |
| 2008/0151888 A1* | 6/2008 | Ahmed ............ 370/390 |
| 2008/0160940 A1 | 7/2008 | Jendbro |
| 2008/0162358 A1 | 7/2008 | Patsiokas et al. |
| 2008/0268772 A1* | 10/2008 | Linnamaki et al. ........ 455/3.04 |
| 2008/0288378 A1 | 11/2008 | Berstis et al. |
| 2009/0005071 A1 | 1/2009 | Forstall et al. |
| 2009/0063975 A1 | 3/2009 | Bull et al. |
| 2009/0070370 A1 | 3/2009 | Cunningham et al. |
| 2009/0100068 A1 | 4/2009 | Gauba et al. |
| 2009/0124226 A1 | 5/2009 | Nakamura et al. |
| 2009/0125609 A1 | 5/2009 | Wood et al. |
| 2009/0158155 A1 | 6/2009 | Quinn et al. |
| 2009/0186629 A1 | 7/2009 | Soelberg et al. |
| 2009/0326949 A1 | 12/2009 | Douthitt et al. |
| 2010/0075593 A1 | 3/2010 | Lee et al. |
| 2010/0075616 A1 | 3/2010 | Haughay, Jr. et al. |
| 2010/0075695 A1 | 3/2010 | Haughay, Jr. et al. |
| 2011/0183603 A1 | 7/2011 | Malik |

FOREIGN PATENT DOCUMENTS

| | | |
|---|---|---|
| EP | 0918408 | 5/1999 |
| JP | 8-006875 | 1/1996 |
| JP | 11-164058 | 6/1999 |
| JP | 11-242686 | 9/1999 |
| JP | 11-317061 | 11/1999 |
| KR | 1999-0073234 | 10/1999 |
| WO | 00/19662 | 4/2000 |
| WO | 00/54462 | 9/2000 |
| WO | 00/70523 | 11/2000 |
| WO | 2007144030 A1 | 12/2007 |
| WO | 2008/080006 | 7/2008 |

OTHER PUBLICATIONS

"Sierra Wireless Announces First Cellular Network Interface Card for Notebook PCs; The AirCard 300 for Windows Changes the Way Notebook PC Users Make Wireless Connections." Business Wire, Jun. 21, 1999 (http://findarticles.com/p/articles/mi_m0EIN/is_1999_June_21/ai_54937451/), retrieved Aug. 5, 2009.

"Cellular for Notebook PCs." CIO vol. 13, No. 1, Section 1, p. 90, Oct. 1, 1999.

"Briefs: Sierra Wireless . . . " NetworkWorld vol. 16, No. 34, p. 27, Aug. 23, 1999.

"Specification of the Bluetooth System, vol. 1." pp. 1-1080, Nov. 29, 1999.

"Specification of the Bluetooth System, vol. 2." pp. 1-438, Nov. 29, 1999.

Pegoraro, "Music Factory; Retailers Struggle to Expand Listening Options Online." Contra Costa Times, Mar. 19, 2000 Sunday Final Edition, Business Section, p. H01.

EMusic.com Inc. Prospectus, Sep. 24, 1999, 85 pages.

Pegoraro, "Logging on; Setting Sound Free From the CD." The Washington Post, Mar. 3, 2000, Final Edition, Fast Forward Section, p. E01.

"Digital Cellular Telecommunications System (Phase 2+); General Packet Radio Service (GPRS); Overall Description of the GPRS Radio Interface; Stage 2 (GSM 03.64 version 6.0.1 Release 1997)" pp. 1-56, Aug. 1998.

"Digital Cellular Telecommunications System (Phase 2+); General Packet Radio Service (GPRS); Overall Description of the GPRS Radio Interface; Stage 2 (GSM 03.64 version 6.1.0 Release 1997)" pp. 1-42, Oct. 1998.

"Digital Cellular Telecommunications System (Phase 2+); General Packet Radio Service (GPRS); Overall Description of the GPRS Radio Interface; Stage 2 (GSM 03.64 version 6.2.0 Release 1997)" pp. 1-42, May 1999.

"Digital Cellular Telecommunications System (Phase 2+); General Packet Radio Service (GPRS); Overall Description of the GPRS Radio Interface; Stage 2 (GSM 03.64 version 6.3.0 Release 1997)" pp. 1-42, Jul. 1999.

"Digital Cellular Telecommunications System (Phase 2+); General Packet Radio Service (GPRS); Overall Description of the GPRS Radio Interface; Stage 2 (GSM 03.64 version 7.0.0 Release 1997)" pp. 1-41, Jul. 1999.

Cai et al. "General Packet Radio Service in GSM." IEEE Communications Magazine, Oct. 1997, pp. 122-131.

"Part 11: Wireless LAN Medium Access Control (MAC) and Physical Layer (PHY) Specifications." IEEE Std 802.11-1997, pp. 1-445.

Lind et al. "The Network Vehicle-A Glimpse into the Future of Mobile Multi-Media." IEEE, pp. 121-1-121-8, 1998.

Knudsen, "MP3 Linux Players." Jul. 1, 1999, http://linuxjournal.com/article/3420, retrieved Jul. 16, 2010.

Jeffrey, "Net Music Firms to Tap Public Market." Billboard, Jul. 17, 1999, 2 pages.

"Digital Download Provider Muscimaker.com Partners With Download Directory Listen.com; Offers Nearly 100,000 Downloadable Tracks Via the Online Directory." PR Newswire, Financial News Section, Sep. 15, 1999, 3 pages.

"Myplay, Inc. Launches Consumer Online Music Service; First in Industry to Focus on Ability to Centrally Store Music and Access it Via Multiple Devices; Company Secures Funding from Noted Venture Capital Firms." PR Newswire, Entertainment, Television, and Culture Section, Oct. 13, 1999, 3 pages.

"Myplay.com Launches Today; New Online Service Makes Downloading Digital Music Easy for Everyone; Sign Up for Free Virtual Locker Get Bonus Tracks From Artists Including Kid Rock, Chris Rock, Buckcherry. Easy Access to Your Music Collection for Download to Portable Music Players." PR Newswire, Entertainment, Television, and Culture Section, Oct. 13, 1999, 2 pages.

Nokia Quick Guide, Accessories Guide, pp. 1-31, 1999.
Nokia 9110i User's Manual, pp. 1-190, 1999.
Qualcomm QCP—1960™, Sprint PCS User Guide, pp. 1-76, Apr. 1999.
RealJukebox Plus Manual, 1999, pp. 1-83.
RealPlayer™ Plus User Manual, 2000, pp. 1-118.
RealPlayer Plus™ G2 Manual, 1998, pp. 1-81.
Samsung Model SCH-3500, Sprint PCS User Guide, pp. 1-108, 1999.
SoundJam™ MP Digital Audio System User Guide, 1999, pp. 1-50.
StarTAC, Sprint PCS User Guide, pp. 1-118, Mar. 1999.
Visteon: For Your Listening Pleasure—Any Music, Any Time, Anwhere (http://www2.prnewswire.com/cgi-bin/stories.pl?ACCT=104&STORY=/www/story/01-05-2000/0001107812&DATE ), originally retrieved Jan. 5, 2000.

* cited by examiner

SYSTEMS, METHODS, AND DEVICES FOR ASSOCIATING A CONTACT IDENTIFIER WITH A BROADCAST SOURCE

REFERENCE TO RELATED APPLICATIONS

This application is related to the following: U.S. Patent Application Publication No. 2010/0076576, filed on published on Mar. 25, 2010, entitled "Systems, Methods, and Devices for Providing Broadcast Media From a Selected Source"; U.S. Patent Application Publication No. 2010/0075593, published on Mar. 25, 2010, and entitled "Media Device with Enhanced Data Retrieval Feature"; and U.S. Patent Application Publication No. 2010/0075695, published on Mar. 25, 2010, and entitled "Systems, Methods, and Devices for Retrieving Local Broadcast Source Presets." The entire contents of the above-referenced applications are incorporated herein by reference.

BACKGROUND

This invention relates to media devices capable of retrieving contact information for a selected broadcast source and providing a user with the ability to initiate a communication with the broadcast source.

Traditional media devices, e.g., an MP3 player, typically connect with a headset to enable a user to listen to music. Other media devices may include a display that displays videos. Many types of media devices are portable and have compact form factors to enable efficient handling and use by a user. Certain media devices include a radio broadcast receiver capable of receiving amplitude modulated (AM), frequency modulated (FM), or satellite broadcast media. The media can typically include a song, video, news program, or radio show. Certain media devices, e.g., cellular telephones, include wireless transceivers capable of exchanging data with a public land mobile network (PLMN) or wireless data network that may be linked with the Internet or other data networks. Other media devices are capable of interfacing with personal area networks (PAN), wireless local area networks (WLAN), satellite data networks (SAN), and other data networks including, for example, Wi-fi (802.x) networks.

In addition to providing broadcast media (e.g., songs, video, television programs, and radio shows), certain broadcast media sources can supplement the broadcast media with broadcast media data. The broadcast media data can include media metadata (e.g., information about a particular song) or data about the broadcast source (e.g., the name of the broadcasting radio station).

The Radio Data System (RDS) is a communications standard developed by the European Broadcasting Union (EBU) that enables the transmission of small amounts of broadcast media data using FM radio broadcasts. RDS can send various types of broadcast media data including: time, track title, track artist, and station identification. RDS has been used in Europe and South America since the early 1990s.

The Radio Broadcast Data System (RBDS) is the name for the North American version of RDS, and is also often referred to simply as "RDS." The North American and European versions are nearly identical. Both RDS versions use a 57 kHz sub carrier to carry broadcast media data at 1187.5 bits per second.

Radio stations often promote contests and other promotions where listeners are encouraged to call into the radio station to win prizes. Many radio stations broadcast talk shows where listeners are encouraged to call in to participate in the talk show.

One problem with participating in radio broadcast contests, talk shows, or listener-participant broadcasts, is that listeners are typically given a relatively small amount of time to call into the show. Even when the radio station announces its telephone number, a listener must typically find his telephone and then dial the number. This process can be inconvenient, time-consuming, and even dangerous, depending on the current activity of the user. Accordingly, there is a need to provide a listener of a broadcast media program with a convenient mechanism to acquire the broadcast source contact information and initiate a communication with the broadcast source.

SUMMARY

The invention, in various embodiments, addresses deficiencies in the prior art by providing systems, methods and devices that enable a media device to retrieve contact data associated with a select broadcast source and provide a user with the capability to quickly and conveniently initiate a communication with the broadcast source.

In one aspect, a media device includes a broadcast receiver that receives broadcast media from a plurality of broadcast sources where the broadcast receiver is tunable to a first broadcast source. The media device also includes a data store that stores a list of contact identifiers where each contact identifier is associated with a broadcast source. The media device includes a user interface that: i) provides a prompt to a user to enable the user to initiate contact with the first broadcast source, and ii) receives a user indication to initiate contact with the first broadcast source. The media device further includes a transceiver that initiates the contact with the first broadcast source by sending a communications session request via a communications network to the first broadcast source that includes a contact identifier associated with the first broadcast source.

In one configuration, the transceiver can continuously initiate the contact, e.g., continuously call a specified telephone number of a broadcast source, until the media device is connected at the desired and/or requested time or calling event, e.g., being the tenth caller to a radio station.

In one feature, at least one contact identifier is provided by the user to the data store via the user interface. The broadcast receiver may receive broadcast media data where the broadcast media data includes at least one contact identifier, e.g., via RDS data. At least one contact identifier may be provided via the received media data to the data store.

In certain configurations, the media device includes a transceiver that: i) sends a query to a media data server for at least one contact identifier associated with the first broadcast source, ii) retrieves at least one contact identifier via a data network, and iii) provides at least one contact identifier to the data store. The media data server may be a clearinghouse server, a web server, or a broadcast source server.

The user interface may include a display, a keypad, a touch screen, clickwheel, touch pad, speaker, and/or microphone. The prompt to a user may include an icon, display button, image, visual indicator, audio indicator, vibration, and the like. The broadcast source may include a radio station, television station, satellite source, and the like.

The contact identifier may include a telephone number, an IP address, a domain name, and/or a URL. In one feature, the broadcast media data may include an IP address, domain name, and/or URL which the media device uses to retrieve the contact identifier from a media server. The media device may retrieve the contact identifier from a clearinghouse server, web server, and/or broadcast source server.

The user indication may include clicking an icon, depressing a button, saying a phrase or word, and/or performing a movement of the media device. In one feature, the media device is tunable to a frequency setting. The media may include a video, an image, audio, audio file, a song, music, multimedia, movie, and/or television data. The communications network may include the PSTN, a wireless data network, a data network, and/or the Internet.

In another feature, a media device includes a broadcast receiver that receives media from a broadcast source. The media device also includes a transceiver that: i) requests and receives a contact identifier associated with the broadcast source via a communications network from a media server, and ii) sends a connection request including the contact identifier associated with the broadcast source to establish a communications connection with the broadcast source via the communications network. The communications connection may include a circuit-switched and/or packet-switched connection.

In a further aspect, a media device includes a broadcast receiver for receiving media and media data from a broadcast source where the media data includes a contact identifier associated with the broadcast source. The media device includes a data store that stores the contact identifier associated with the broadcast source and a user interface that receives a user indication to initiate contact with the broadcast source. The media device also includes a transceiver that sends a connection request, in response to the user indication, which includes the contact identifier associated with the broadcast source to establish a communications connection with the broadcast source via a communications network.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DESCRIPTION OF THE INVENTION

Figure 1:
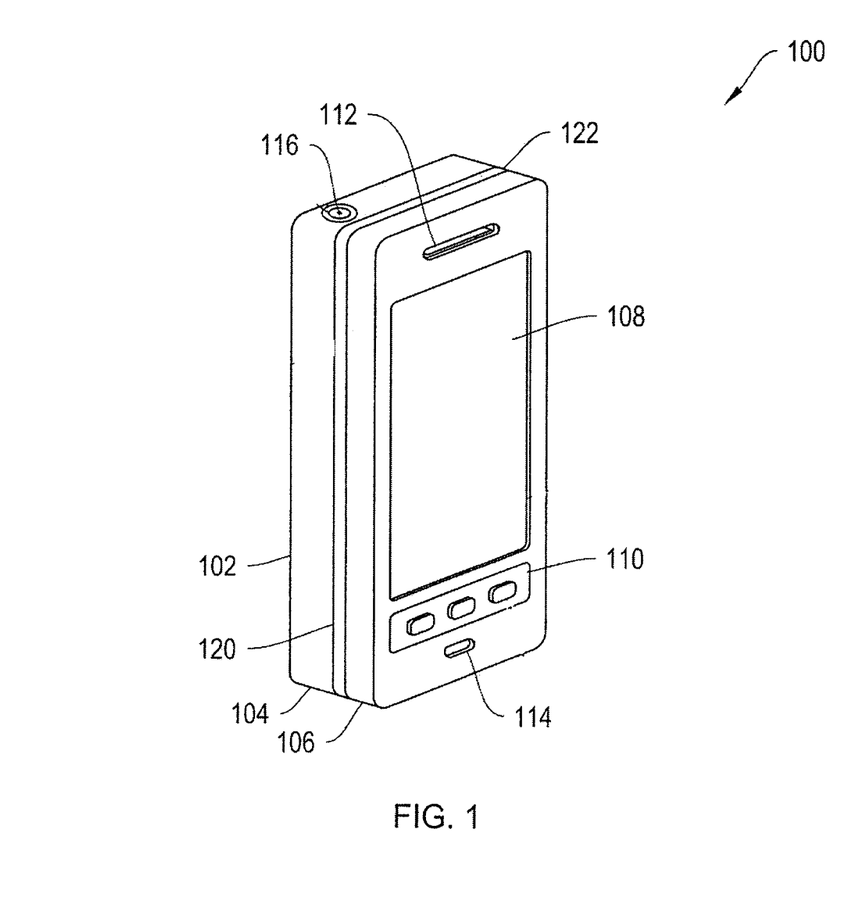
FIG. 1 is a perspective view of a media device according to an illustrative embodiment of the invention.

FIG. 1 is a perspective view of a media device 100 according to an illustrative embodiment of the invention. The device 100 includes a housing 102, a first housing portion 104, a second housing portion 106, a display 108, a keypad 110, a speaker housing aperture 112, a microphone housing aperture 114, a headphone jack 116, and frame sidewall 122. In certain embodiments, the frame sidewall 122 is the exposed portion of a frame residing within or adjacent to the housing 102 that provides structural support for the media device 100 and various internal components.

In one embodiment, the housing 102 includes a first housing portion 104 and a second housing portion 106 that are fastened together and/or to the frame sidewall 122 to encase various components of the media device 100. The housing 102 and its housing portions 104 and 106 may include polymer-based materials that are formed by, for example, injection molding to define the form factor of the media device 100. In one embodiment, the housing 102 surrounds and/or supports internal components such as, for example, a display 108, one or more circuit boards having integrated circuit components, internal radio frequency (RF) circuitry, an internal antenna, a speaker, a microphone, a hard drive, a processor, and other components. Further details regarding certain internal components are discussed herein with respect to FIG. 4. The housing 102 provides for mounting of a display 108, keypad 110, external jack 116, data connectors, or other external interface elements. The housing 102 may include one or more housing apertures 112 to facilitate delivery of sound, including voice and music, to a user from a speaker within the housing 102. The housing 102 may include one or more housing apertures 114 to facilitate the reception of sounds, such as voice, for an internal microphone from a device user.

Personal computing devices and/or media devices of this type may include a touchscreen control, such as a Pronto made available by Royal Philips Electronics of the Netherlands or a GPS receiver made available by Garmin International, Inc. of Olathe, Kans. In certain embodiments, the display 108 includes a graphical user interface (GUI) to enable a user to interact with the device 100. The personal computing device 100 may also include an image sensor such as a camera capable of capturing photographic images and/or video images.

Figure 2:
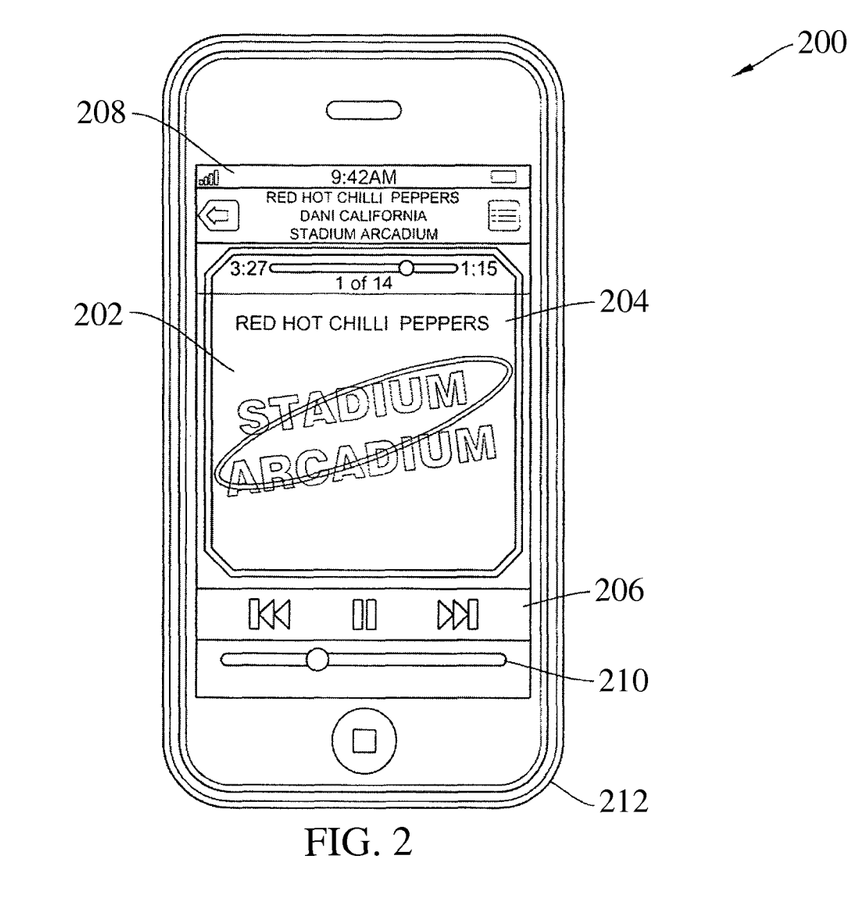
FIG. 2 is a view of a media device according to an illustrative embodiment of the invention.

FIG. 2 is a view of another personal media device 200 according to an illustrative embodiment of the invention. The media device 200 includes a display 202 showing a status bar 208 and video image 204, which may include, for example, a music video, a movie, video clip, or like video images. In one embodiment, a GUI of the display 202 includes an interface 206 that enables the media device 200 user to play, pause, fast forward, reverse, or monitor, via a slider 210, the progress of the video displayed on the display 202 or audio being played by the media device 200. The media device 200 includes a housing base 212.

Figure 3:
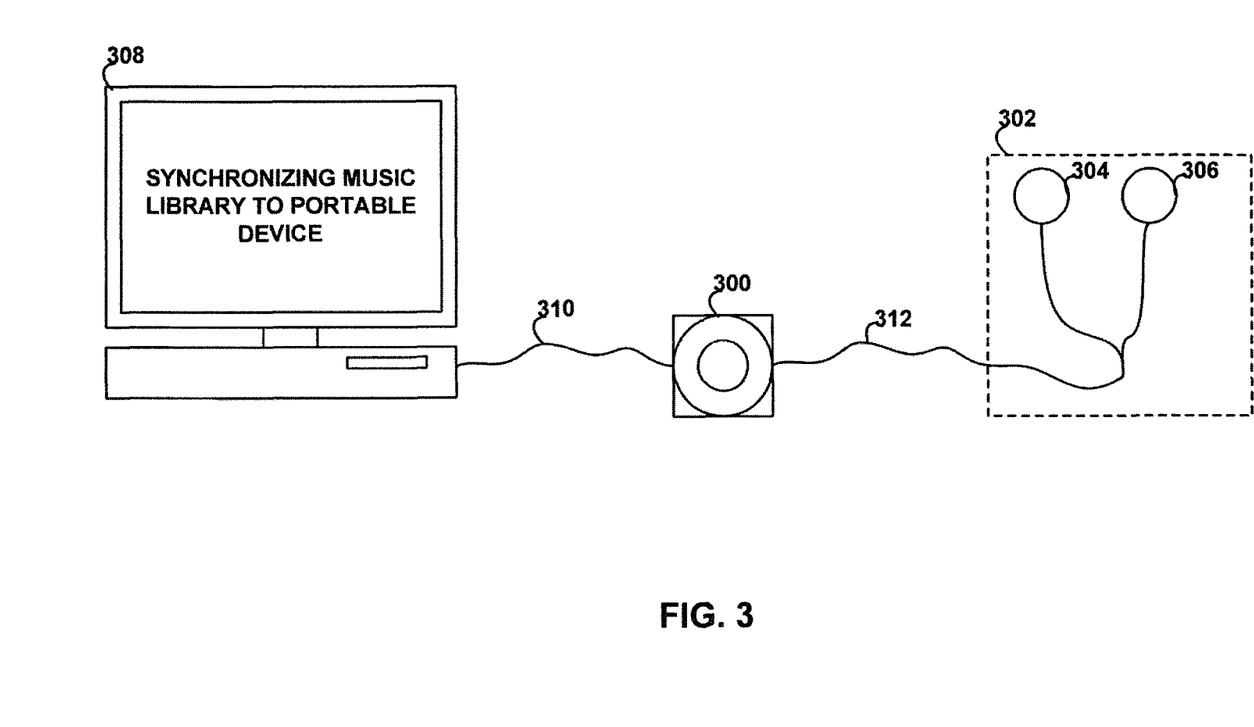
FIG. 3 is a communications topology including a media device according to an illustrative embodiment of the invention.

FIG. 3 shows a communications topology including a computer 308, media device 300, and a headset 302. Media device 300 may communicate with computer 308 via communications channel 310. Media device 300 may communicate with the headset 302 via communications channel 312. In one embodiment, communications channel 312 is a wired communication channel. Alternatively, the communications channel 312 may be wireless.

Media device 300 may take any form. For example, media device 300 may be a portable media player such as a portable music player. Media device 300 may also include, for example, a mobile telephone that may play downloaded media. Media may be downloaded directly to the media device 300 or may be downloaded to computer 308 and transferred to the media device 300 via communications channel 310.

The media device 300 may include a wireless communications device such as a cellular telephone, satellite telephone, cordless telephone, personal digital assistant (PDA), pager, portable computer, or any other device capable of wireless communications. In fact, FIG. 2 shows an exemplary cellular telephone version of a broad category of media device 300. The media device 300 may be compact, portable, mobile, personal, and/or transportable.

The media device 300 may also be integrated within the packaging of other devices or structures such as a vehicle, video game system, appliance, clothing, helmet, glasses, wearable apparel, stereo system, computer system, entertainment system, or other portable devices. In certain embodiments, the media device 300 may be docked or connected to a wireless (e.g., a wi-fi docking system) and/or radio enabling accessory system (e.g., AM/FM or satellite radio receiver) that provides the media device 300 with short-range communicating functionality and/or radio reception capability. Alternative types of media devices 300 may include, for example, a media player such as an iPod®, iPod® Nano, iPod® Shuffle, or Apple® iphone available by Apple Inc., of Cupertino, Calif., pocket-sized personal computers such as an iPAQ® Pocket PC available by Hewlett Packard Inc., of Palo Alto, Calif. and any other device capable of communicating wirelessly (with or without the aid of a wireless enabling accessory system).

In certain embodiments, the media device 300 may synchronize with, for example, a remote computing system or server, e.g., computer 308, to receive media (using either wireless or wireline communications paths). Wireless syncing enables the media device 300 to transmit and receive media and data without requiring a wired connection. Media may include, without limitation, sound or audio files, music, video, multi-media, and digital data, in streaming and/or discrete (e.g., files and packets) formats.

During synchronization, a host system, e.g., device 308, may provide media to a client system or software application embedded within the media device 300. In certain embodiments, media and/or data is "downloaded" to the media device 300. In other embodiments, the media device 300 is capable of uploading media to a remote host or other client system.

The headset 302 may be utilized to provide an audio functionality associated with media device 300. The headset 302 may include speakers 304 and 306 as well as a microphone.

Figure 4:
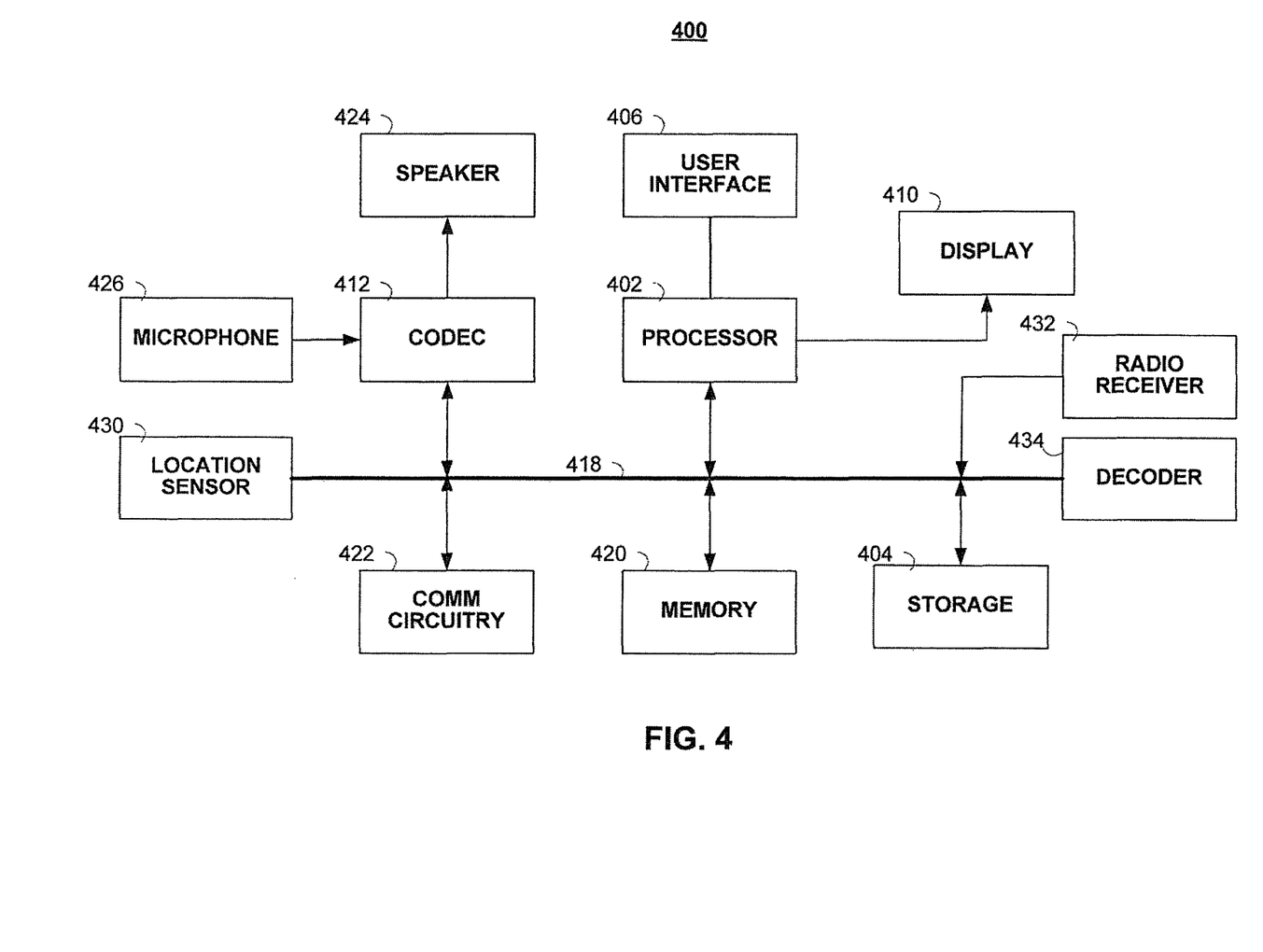
FIG. 4 shows a simplified functional block diagram of a media device according to an illustrative embodiment of the invention.

FIG. 4 shows a simplified functional block diagram of a media device 400 according to an illustrative embodiment of the invention. The block diagram provides a generalized block diagram of a computer system such as may be employed, without limitation, by the media devices 100, 200, and 300. The media device 400 may include a processor 402, storage device 404, user interface 406, display 410, CODEC 412, bus 418, memory 420, communications circuitry 422, a speaker or transducer 424, a microphone 426, a location sensor 430, a radio receiver 432, a radio receiver decoder 434, and communications circuitry to facilitate communications with a headset 302, other media device, or other system via a communications network. Processor 402 may control the operation of many functions and other circuitry included in media device 400. Processor 402 may drive display 410 and may receive user inputs from the user interface 406.

Storage device 404 may store media (e.g., music and video files), software (e.g., for implementing functions on device 400), preference information (e.g., media playback preferences), lifestyle information (e.g., food preferences), personal information (e.g., information obtained by exercise monitoring equipment), transaction information (e.g., information such as credit card information), word processing information, personal productivity information, wireless connection information (e.g., information that may enable media device 400 to establish wireless communication with another device), subscription information (e.g., information that keeps tracks of podcasts or television shows or other media that a user subscribes to), radio station broadcast source information, and any other suitable data. Storage device 404 may include one more storage mediums, including for example, a hard-drive, permanent memory such as ROM, semi-permanent memory such as RAM, or cache.

Memory 420 may include one or more different types of memory which may be used for performing device functions. For example, memory 420 may include cache, ROM, and/or RAM. Bus 418 may provide a data transfer path for transferring data to, from, or between at least storage device 404, memory 420, and processor 402. Coder/decoder (CODEC) 412 may be included to convert digital audio signals into analog signals for driving the speaker 424 to produce sound including voice, music, and other like audio. The CODEC 412 may also convert audio inputs from the microphone 426 into digital audio signals. The CODEC 412 may include a video CODEC for processing digital and/or analog video signals.

User interface 406 may allow a user to interact with the media device 400. For example, the user interface 406 can take a variety of forms, such as a button, keypad, dial, a click wheel, or a touch screen. Communications circuitry 422 may include circuitry for wireless communication (e.g., short-range and/or long range communication). For example, the wireless communication circuitry may be Wi-Fi enabling circuitry that permits wireless communication according to one of the 802.1x standards. Other wireless network protocol standards could also be used, either in alternative to the identified protocols or in addition to the identified protocols. Other network standards may include Bluetooth, the Global System for Mobile Communications (GSM), code division multiple access (CDMA), and long-term evolution (LTE) based wireless protocols. Communications circuitry 422 may also include circuitry that enables the media device 400 to be electrically coupled to another device (e.g., a computer or an accessory device) and communicate with that other device.

In one embodiment, the media device 400 may be a portable computing device dedicated to processing media such as audio and video. For example, the media device 400 may be a media device such as a media player (e.g., MP3 player), a game player, a remote controller, a portable communication device, a remote ordering interface, an audio tour player, or other suitable media device. The media device 400 may be battery-operated and highly portable so as to allow a user to listen to music, play games or video, record video or take pictures, communicate with others, and/or control other devices. In addition, the media device 400 may be sized such that it fits relatively easily into a pocket or hand of the user. By being handheld, the media device 400 (or media devices 100, 200, and 300) is relatively small and easily handled and utilized by its user and thus may be taken practically anywhere the user travels.

The media device 400 may employ a location sensor 430 to enable the media device to determine its geographic location in support of location-based services and other services. The location sensor 430 may include a global position system (GPS) receiver. The location sensor 430 may include one or more radio receivers that perform radio doppler and/or triangulation sensing to determine the media device 400 location. In certain embodiments, the location sensor 430 may be integrated with the communications circuitry 422. In one embodiment, the location sensor 430 may include a data decoder such as decoder 434 that decodes a source identifier broadcast by a radio source (e.g., radio station identifier or cellular network system identifier (SID)).

Figure 5:
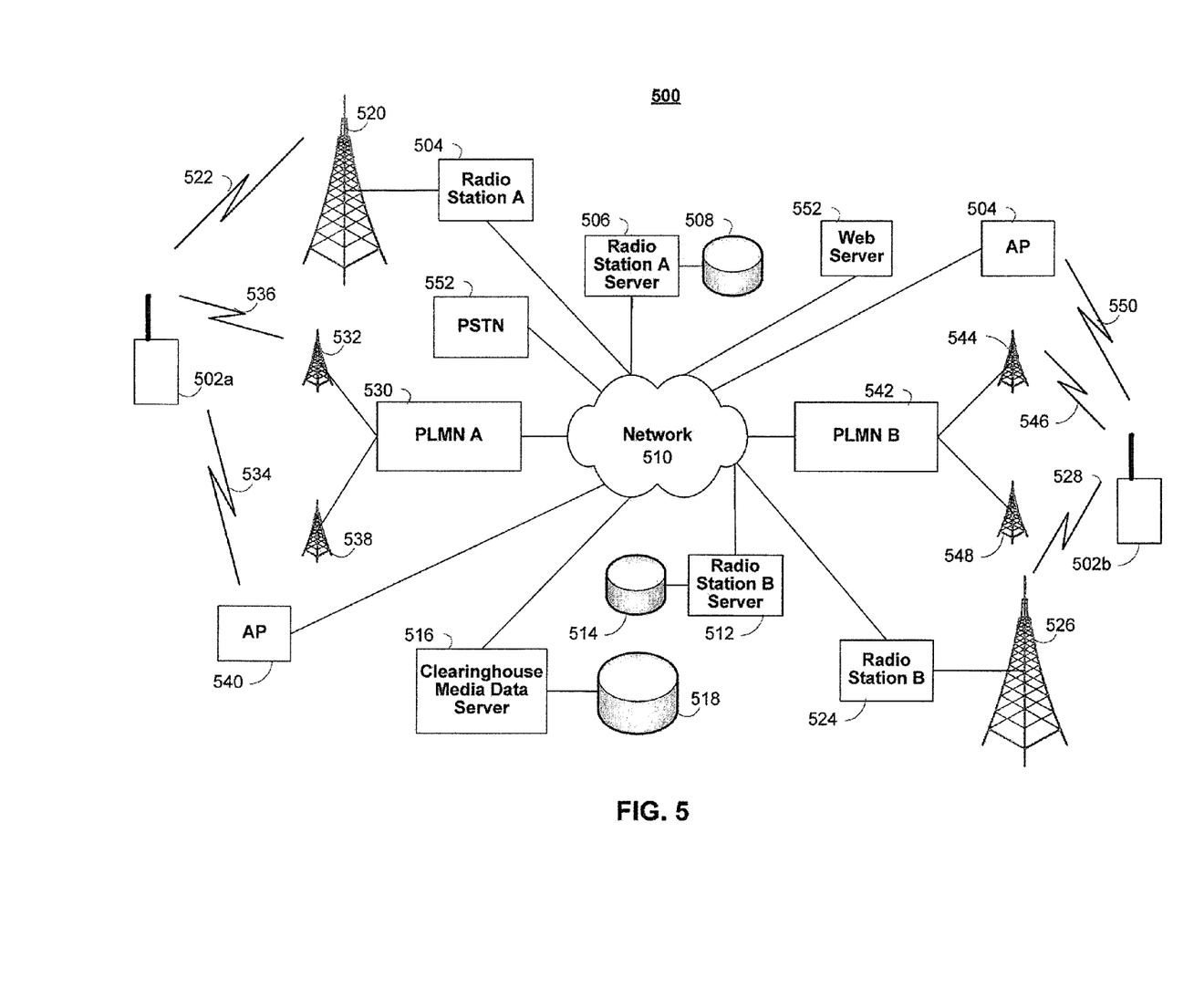
FIG. 5 shows a diagram of a distribution system for media and media data according to an illustrative embodiment of the invention.

FIG. 5 shows a diagram of a media distribution system 500 according to an illustrative embodiment of the invention. The media distribution system 500 includes a media device 502, a broadcast radio station 504, a broadcast radio station 524, a public land mobile network (PLMN) 530, a PLMN 542, an access point (AP) 540, and AP 504, a data network 510, a public switched telephone network (PSTN) 552, and a clearinghouse server 516. The network 510 may include the Internet. The radio station 504 may include a radio station tower 520 that facilitates the broadcast of a broadcast radio signal 522 to a plurality of media devices including media device 502. Also, the radio station 524 may include a radio station tower 526 that facilitates the broadcast of a broadcast radio signal 528 to a plurality of media devices including media device 502.

The broadcast radio signal may be, without limitation, frequency modulated (FM) or amplitude modulated (AM). The interfaces 522 and 528 may operate in an AM frequency band of about 500-1500 kHz. The interfaces 522 and 528 may operate in an FM and/or television frequency band of about 54-1600 MHz. The interfaces 522 and 528 may operate in any number of frequency bands such as, for example, a satellite frequency band. The radio station 504 may be associated with a radio station server 506 that includes a database 508 for storing media and/or media data. The radio station 524 may be associated with a radio station server 512 that includes a database 514 for storing media and/or media data.

The PLMNs 530 and 542 may include a cellular telephone network. The PLMNs 530 and 542 may utilize a plurality of cellular radio towers 532, 538, 544, and 548 respectively. The media device 502 may exchange data and other communications with the PLMN 530 and/or 542 via a wireless communications channel 536 and/or 546 respectively. The media device 502 may exchange data and other communications with the AP 540 and/or AP 504 via a wireless communications channel 534 and 550 respectively. The clearinghouse media data server 516 may include a database 518 for storing media and/or media data.

Figure 6:
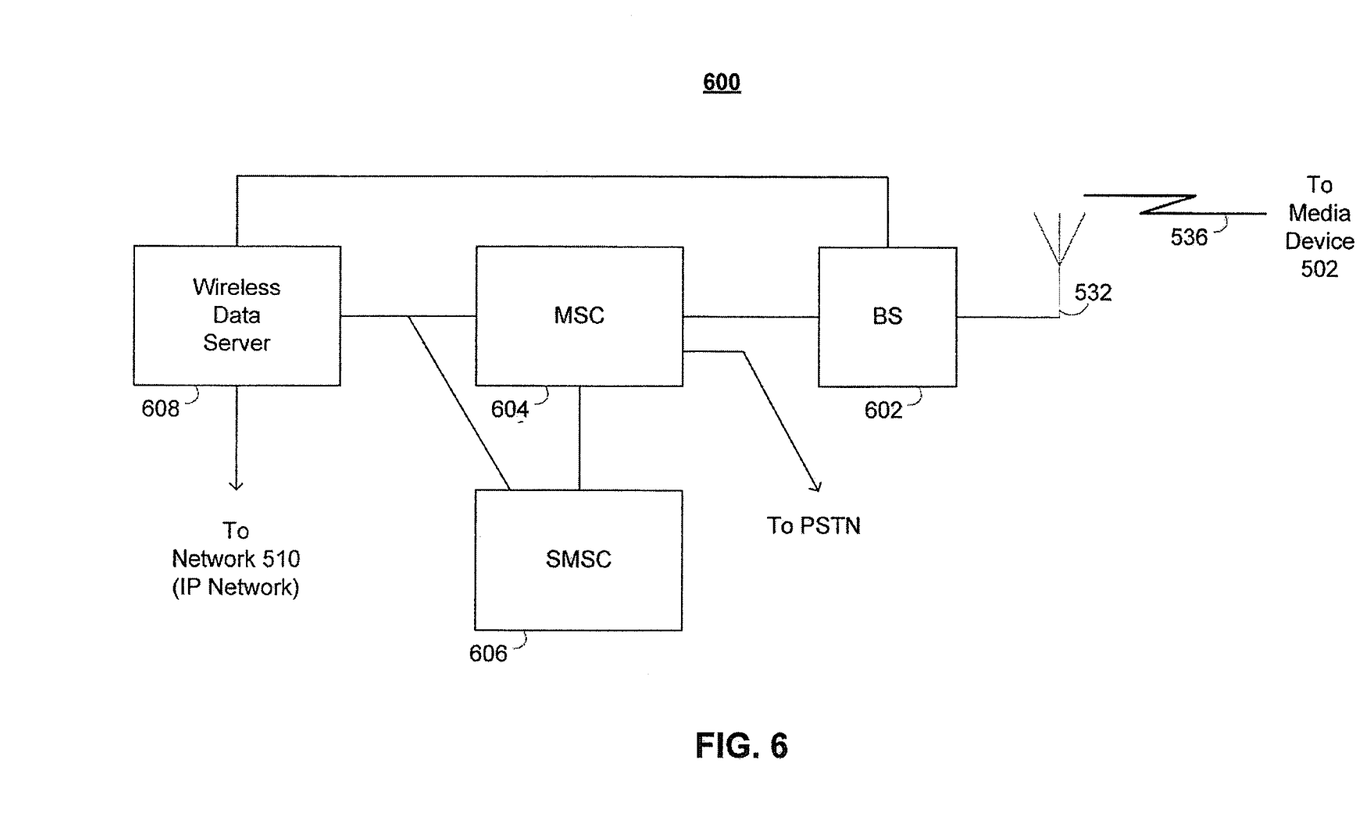
FIG. 6 shows a diagram of a public land mobile network (PLMN) data distribution system according to an illustrative embodiment of the invention.

FIG. 6 shows a diagram of a public land mobile network (PLMN) 600 according to an illustrative embodiment of the invention. A PLMN may include a wireless telecommunications network and/or a cellular telephone network such as a Global System for Mobile communications (GSM), cdma2000 system, ANSI-136 TDMA system, LTE, and like wireless communications networks. These networks may also provide data communications services such as Evolution-data only (EV-DO), General Packet Radio Service (GPRS), wireless application protocol (WAP), cellular digital packet data (CDPD), and like wireless data services.

PLMN networks are generally referred to as cellular networks because they employ a frequency re-use architecture in which wireless access channels are grouped into geographically-located cells and sectors. The size of each cell depends on the output power of the network base station (BS) transceiver, e.g., BS 602, associated with each cellular tower 532 and cell. Each access channel uses a certain frequency band in one geographic cell that is re-used in another cell, geographically separated from the first cell, by another access channel where the likelihood of interference is minimized.

These networks also use a centralized switch or server such as the mobile switching center (MSC) 604 to enable a wireless device to move from cell to cell while maintaining a persistent data connection. In the United States, cellular and Personal Communications Service (PCS) networks operate in the licensed commercial 800-900 Mhz and 1900-2100 Mhz ranges. Access data channels, however, may be bandwidth limited to 30 khz, 200 khz, or 1.24 Mhz depending on the wireless air interface standard used.

PLMN networks primarily provide voice communications while also providing relatively low rate data communications (e.g., 9.6-140 kbps). PLMN networks such as the Global System for Mobile Communications (GSM) and cdma 2000 provide a Short Message Service (SMS) that enables telephone users to send relatively short, e.g., about 160 bytes, messages to other cellular telephones or to traditional electronic mail (e-mail) accounts within land-based IP networks.

A Short Message Server Center (SMSC) 606 typically coordinates with the MSC 604 to distribute SMS messages to cellular telephones and/or media devices 502. The SMSC may also interface with a wireless data server 608 to send SMS messages with destination addresses, e.g., e-mail addresses, external to the PLMN 600. The SMSC may include a mail server and/or other functionality to convert SMS messages to the proper e-mail format if necessary. Alternatively, the wireless data server may include a mail server such as a POP and/or Exchange server to facilitate the delivery of e-mail messages to and from the PLMN 600.

SMS messages may be transmitted over the air interface 536 via the traffic and/or control channels of the PLMN 600 network. While SMS messages are typically limited to about 160 bytes in length, longer text messages may be sent to or received by a media device 502. This may be performed by breaking a larger message into multiple SMS messages for delivery and then reassembling the multiple SMS messages into the original message upon receipt. Multimedia message services (MMS) may also be employed having messages that include text, video, pictures, and audio.

Recently, PLMN providers have launched higher bandwidth data networks such as cdma2000 Evolution Data Only (EVDO) networks that provide up to 2 Mbps and Third Generation GSM (3GSM) networks that provide approximately 300 kbps data rates. These higher rate data services may employ point-to-point (PPP), simple IP and/or mobile IP (MIP) protocols to more efficiently interface with traditional IP networks such as network 510 and/or the Internet. The wireless data server 608 may function as a cdma2000 and/or GPRS Packet Data Server Node (PDSN), MIP Home Agent, MIP Foreign agent, wireless data gateway, and like systems to facilitate data communications with an external data network such as the network 510.

Using circuit-switched and/or packet-switched data services, the PLMN 600, 530, and 542 enable a media device 502 to act like a network interface to another data network such as the Internet. Thus, media device 502 may employ any of the applications and features of a standard workstation and/or home personal computer, subject to the processing speed, power, and memory constraints of a compact and mobile device. For example, the media device 502 may utilize a WWW browser employing HTML, WML, XML, and like markup languages to facilitate access to a remote web server, e.g., server 552, 506, 512, and/or 516, via the network 510. The media device 502 may utilize certain applications that enable the exchange of data with remote data servers connected to the network 510. Data may be transported to and from the network 510 via the wireless data server 608. In these instances, the wireless data server 608 exchanges data with the BS 602. The BS 602, in turn, transmits data to and/or receives data from the media device 502 via one or more data traffic channels on the air interface 536 or 546.

Figure 7:
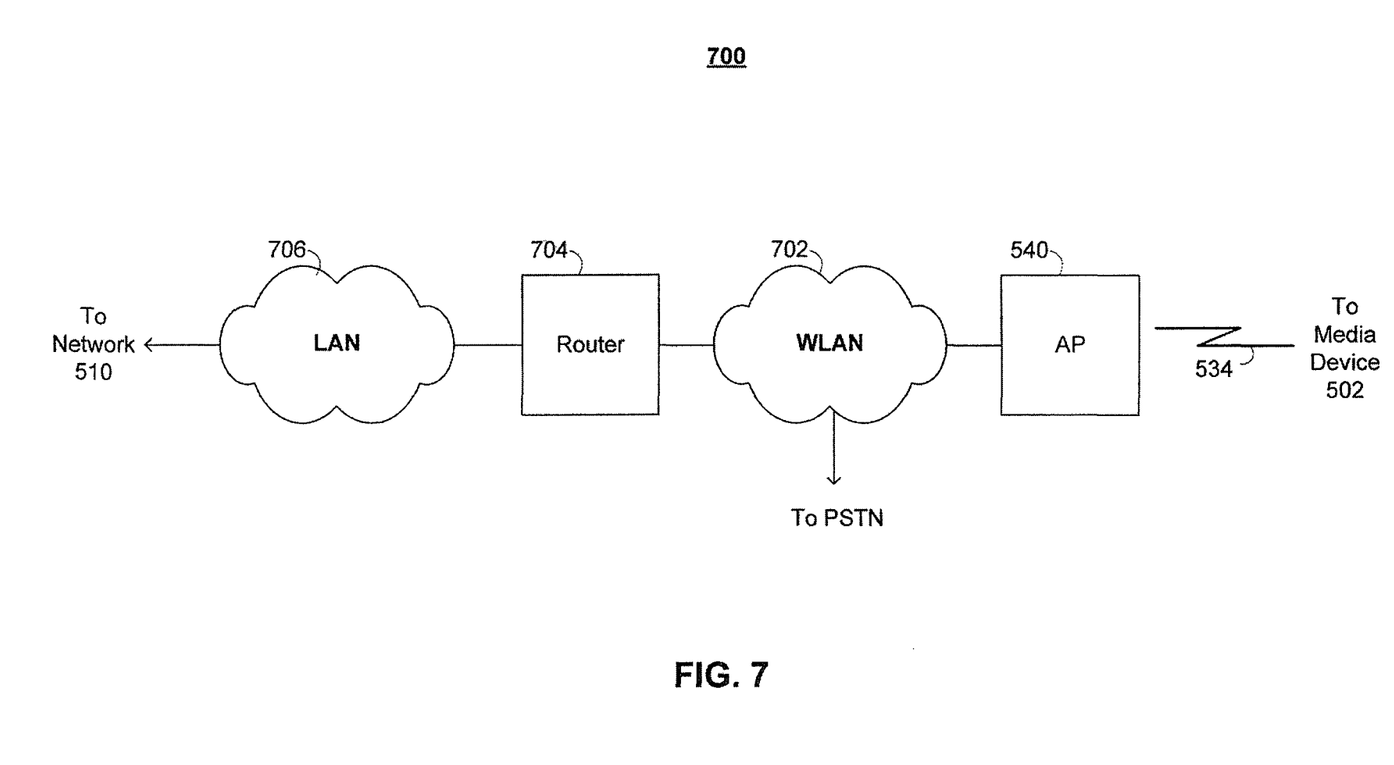
FIG. 7 shows a diagram of a wireless access network including an access point according to an illustrative embodiment of the invention.

FIG. 7 shows a diagram of a wireless access network 700 including an access point (AP) 540 according to an illustrative embodiment of the invention. A wireless access network may include any wireless network that facilitates communications from one communications device to another or to another network such as the Internet. Typical wireless access networks include 802.11, WiFi, WiMAX, Bluetooth, proprietary wireless LANs, wide area wireless networks, and like wireless access networks.

The wireless access network 700 includes an AP 540, a wireless LAN (WLAN) 702, router 704, and local area network (LAN) 706. The LAN may be connected to network 510 via one or more data networks. The WLAN 702 may be connected to the PSTN 552 via one or more network interfaces. The AP 540 may connect with one or more media devices 502. WLAN networks, such as WLAN 702, employ wireless APs 540 to communicate with multiple wireless devices, e.g., media device 502, simultaneously via a set of wireless access channels.

While the wireless access network 700 may not support SMS messaging as with the PLMN 600, the wireless access network 700 is capable of supporting relatively high data rate communications between a media device 502 and the network 510. Furthermore, the wireless access network 700 can support higher layer protocols such as TCP/IP, HTTP, and UDP, which enable the use of a web browser and other applications at the media device 502.

Returning to FIG. 5, in operation, the media device 502 may move from one geographic location in the vicinity of certain wireless communications infrastructure elements to another geographic location in the vicinity of other wireless communications infrastructure elements. For example, FIG. 5 refers to media device 502 as media device 502a while the device is in the vicinity of radio station 504, but then refers to media device 502 as media device 502b when the device is in the vicinity of radio station 524. In other embodiments, the terms 502a and 502b can refer to different media devices.

As discussed previously, a media device 502 may include a broadcast radio receiver, e.g., radio receiver 432, that enables the media device 502 to receive media from a plurality of radio stations, e.g., radio station 504, within its vicinity. The media device 502 may include the capability to enable a user to configure a set of favorite radio stations and/or radio station frequencies so that the user can conveniently tune the broadcast radio receiver 432 to a favorite radio station.

In addition to the radio receiver 432, the media device 502 may include a data transceiver as part of its communications circuitry 422 to facilitate the exchange of data with a PLMN, e.g., PLMN 530, a wireless access network, e.g., via AP 540, or another like wireless data network. In certain embodiments, the media device 502 may utilize a data transceiver to supplement broadcast media and/or media data received from a radio station such as radio stations 504 and 524. In one embodiment, the media device 502 is capable of querying a clearinghouse media data server 516 via a wireless data network (e.g., PLMN or wireless access network) to obtain media and/or media data. A clearinghouse server 516 may include one or more data servers and systems that perform a network-based service via, for example, the Internet. One example of a clearinghouse media data server 516 is the iTunes® music downloading service, made available by Apple Inc. of Cupertino, Calif. Media data may include metadata and/or data about or related to media. For example, media data may include an image such as album cover art related to a song. Media data may also include information related to a broadcast source of the media such as the name of a radio station playing a song. In certain embodiments, the media device 502 can retrieve media and/or media data from a radio station server 506 and/or its associated database 508, the clearinghouse server 516 and/or its associated database 518, a remote web server 552, and any other data source in communication with the network 510. The broadcast sources 504 and 524 may utilize the RDS system to provide a limited amount of information such as a song title, artist name, 64-character text, a station call sign, radio station music categories (e.g., rock, country, classical, and so on), and other information.

Radio stations often promote contests or provide other promotions where listeners are encouraged to call into the radio station to win prizes. Many radio stations also broadcast talk shows where listeners are encouraged to call in to the radio station to participate in the talk show.

One problem with participating in radio broadcast contests, talk shows, or listener-participant broadcasts, is that listeners are typically given a relatively small amount of time to call into the show. Alternatively, the listener must call at a particular time, in a particular sequence, and/or be at a particular point in a queue of callers (e.g., the fifth caller). Even when the radio station announces its telephone number, a listener must typically find his telephone and then dial the number. This process can be inconvenient, time-consuming, and even dangerous, depending on the current activity of the user. Thus, the present invention addresses this problem by advantageously enabling a listener of a broadcast media program to use a convenient mechanism to acquire the broadcast source contact information and initiate a communication with the broadcast source.

Figure 8:
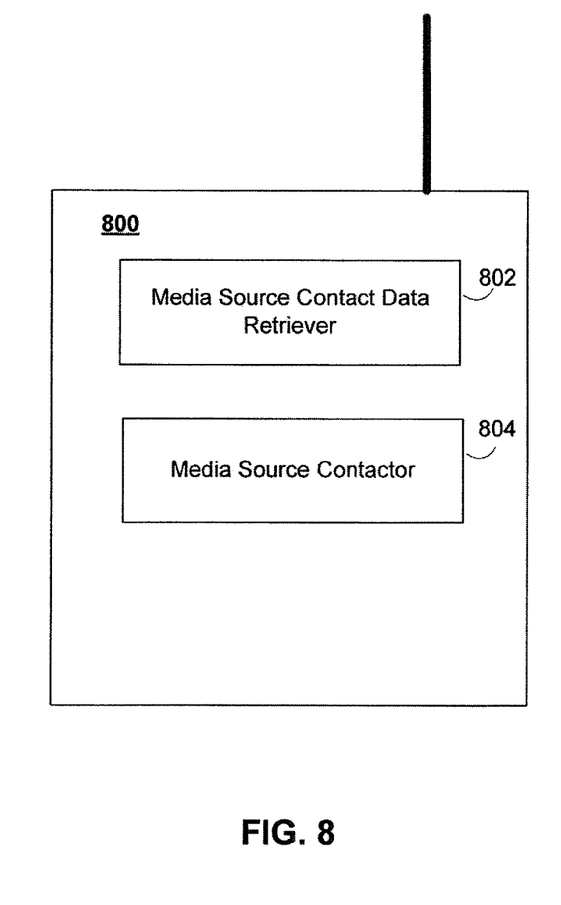
FIG. 8 is a diagram of a computer processing environment including various applications or routines running within a media device according to an illustrative embodiment of the invention.

FIG. 8 is a diagram of a computer processing environment including various functions running within a media device 800 according to an illustrative embodiment of the invention. The media device 800 may include a media source contact data retriever application 802 and a media source contactor application 804.

Figure 9:
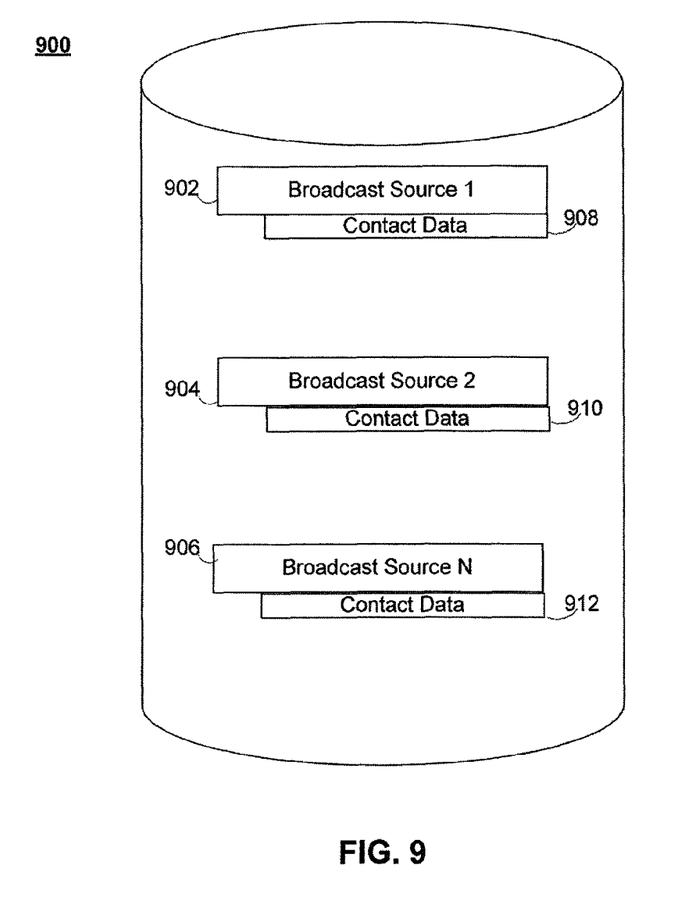
FIG. 9 shows a database according to an illustrative embodiment of the invention.

In one embodiment, the media device 800 and/or 502 includes a broadcast receiver that receives broadcast media from a plurality of broadcast sources 504 and 524 where the broadcast receiver is tunable to a first broadcast source, e.g., radio station 504. In certain embodiments, the media device 800 includes a data retriever application 802 that controls a transceiver such that the transceiver requests and retrieves one or more contact identifiers from a media server 516. Alternatively, the media device 800 may receive one or more contact identifiers from broadcast media data, e.g., RDS data, associated with broadcast media. The media device 800 may also receive one or more contact identifiers from a user via the user interface such as user interface 406. The media device 800 may include a data store 900 that stores a list of contact identifiers where each contact identifier is associated with a broadcast source 902, 904, and 906.

FIG. 9 includes a database and/or list 900 of broadcast source contact information 908, 910, and 912 that is associated with broadcast sources 902, 904, and 906, respectively, according to an illustrative embodiment of the invention. The contact information may include one or more contact identifiers such as, without limitation, a telephone number, an IP address, a domain name, a URL, and/or electronic address of an entity. In one embodiment, a portion of the database 900 is located remotely at, for example, media server 516. In another embodiment, the database 900 is included within the media device 800, and is periodically updated with information from a remote server such as media server 516.

The media device 800 may include a user interface that provides a prompt to a user to enable the user to initiate contact with a first broadcast source, e.g., radio station 504. The user interface may provide the prompt when the media device 800 is tuned to the broadcast source 504. The user interface may then receive a user indication to initiate contact with the first broadcast source 504. The media device 800 may include a media source contactor application 804 that controls the operation of the transceiver. The transceiver may initiate contact with the first broadcast source 504 by sending a communications session request via a communications network, e.g., PLMN 530, to the first broadcast source 504 that includes a contact identifier 908 associated with the first broadcast source 902 or 504.

The transceiver, e.g., communications circuitry 422, can continuously initiate the contact, e.g., continuously call a specified telephone number of the broadcast source 504, until the media device 800 is connected at a desired and/or requested time or calling event, e.g., when connecting as the tenth caller to the radio station 504.

At least one contact identifier 908 may be provided by the user to the data store 900 via the user interface, e.g., user interface 406. The broadcast receiver, e.g., radio receiver 432, may receive broadcast media data where the broadcast media data includes at least one contact identifier 908, e.g., via RDS data, that is then provided to the data store 900.

In certain embodiments, the media device 800 includes a transceiver that: i) sends a query to a media data server 516 for at least one contact identifier 908 associated with the first broadcast source 504, ii) retrieves at least one contact identifier 908 via a data network 530, 540, and/or 510, and iii) provides at least one contact identifier 908 to the data store 900. The media data server may include a clearinghouse server 516, a web server 552, and/or a broadcast source server 506.

The user interface 406 may include a display, a keypad, a touch screen, clickwheel, touch pad, speaker, and/or microphone. The prompt to a user may include an icon, display button, image, visual indicator, audio indicator, vibration, and the like. The broadcast source 504 may include a radio station, television station, satellite source, and the like.

In one embodiment, the broadcast media data may include an IP address, domain name, and/or URL which the media device 800 uses to retrieve the contact identifier 908 from a media server 516. The media device 800 may retrieve the contact identifier 908 from the clearinghouse server 516, web server 552, and/or broadcast source server 506.

The user indication may include clicking an icon, depressing a button, saying a phrase or word, and/or performing a movement of the media device 800. In one embodiment, the media device 800 is tunable to a frequency setting associated with a broadcast source. The media may include a video, an image, audio, audio file, a song, music, multimedia, movie, and/or television data. The communications network may include the PSTN 552, a wireless data network 540, a data network 530 and/or 510, and/or the Internet.

In another embodiment, the media device 800 includes a broadcast receiver 432 that receives media from a broadcast source 504. The media device 800 also includes a transceiver that: i) requests and receives a contact identifier 908 associated with the broadcast source 504 via a communications network, e.g., network 510, from a media server 516, and ii) sends a connection request including the contact identifier 908 associated with the broadcast source 504 to establish a communications connection with the broadcast source 504, e.g., at server 506, via the communications network 510. The communications connection may include a circuit-switched and/or packet-switched connection.

Figure 10:
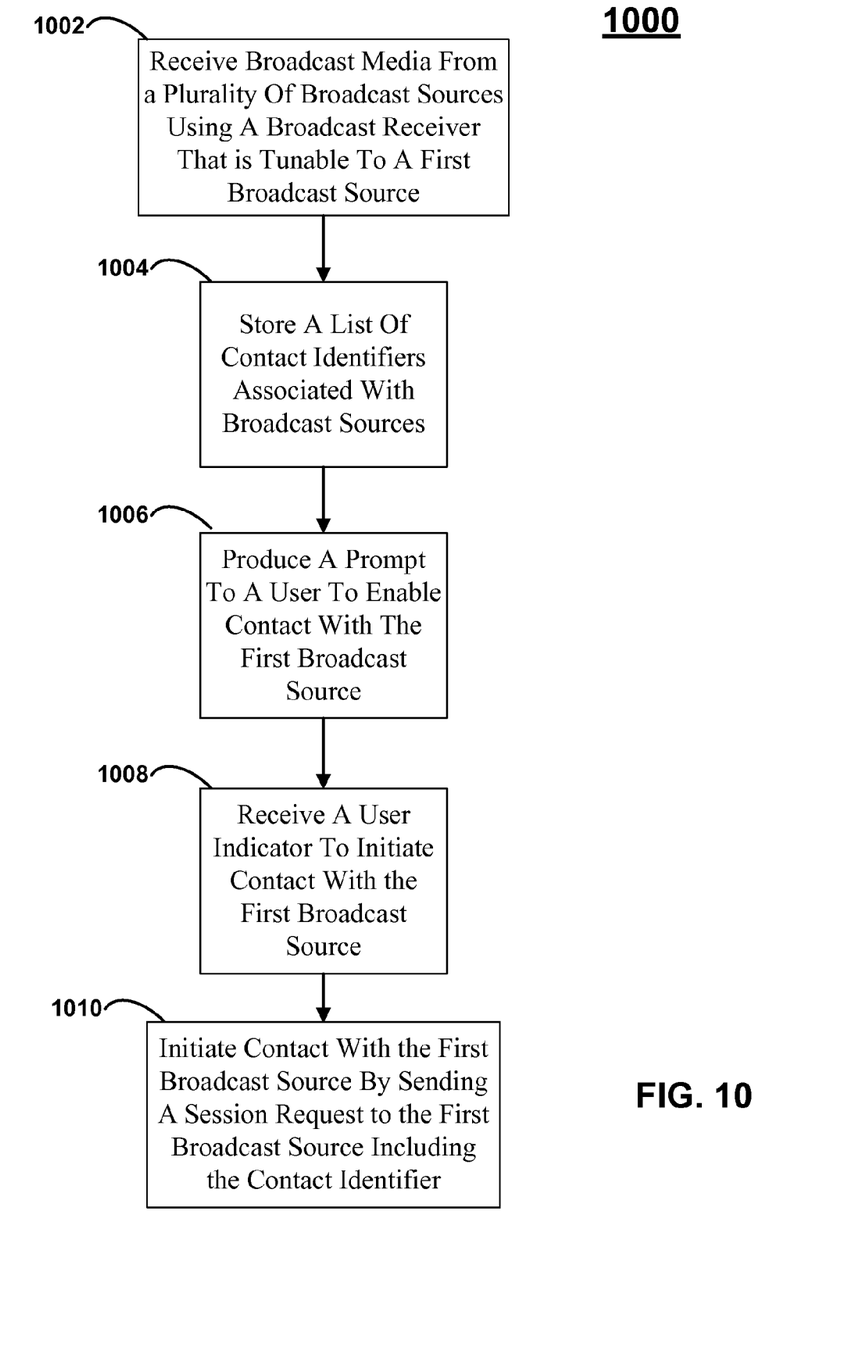
FIG. 10 is a flow diagram of a process for distributing broadcast source preset data according to an illustrative embodiment of the invention.

FIG. 10 is a flow diagram of a process 1000 for initiating contact with a broadcast source 504 from a media device 502. First, the media device 502 receives broadcast media from a plurality of broadcast sources, e.g., radio stations 504 and 524 using a broadcast receiver where the broadcast receiver is tunable to a first broadcast source 504 (Step 1002). Then, the media device stores a list of contact identifiers 908, 910, and 912 where each contact identifier is associated with one of the plurality of broadcast sources 902, 904, and 906 (Step 1004). The media device 502 or 800 provides a prompt to a user to enable the user to initiate contact with the first broadcast source 504 (Step 1006). The media device 502 then receives a user indication to initiate contact with the first broadcast source 504 (Step 1008). Then, the media device 502 initiates contact with the first broadcast source 504 by sending a communications session request to the first broadcast source 504 including a contact identifier 908 associated with the first broadcast source 504 and/or 902 (Step 1010).

Persons skilled in the art will appreciate that the various configurations described herein may be combined without departing from the present invention. It will also be recognized that the invention may take many forms other than those disclosed in this specification. Accordingly, it is emphasized that the invention is not limited to the disclosed methods, systems and apparatuses, but is intended to include variations to and modifications thereof which are within the spirit of the following claims.

What is claimed is:

1. A media device comprising:
  a broadcast receiver for receiving broadcast media and associated broadcast media data from a plurality of broadcast sources, the broadcast receiver being tunable to a first broadcast source,
  a data store for storing a list of contact identifiers, each contact identifier being associated with one of the plurality of broadcast sources,
  a user interface for: i) providing a prompt to a user to enable the user to initiate contact with the first broadcast source, and ii) receiving a user indication to initiate contact with the first broadcast source, and
  a transceiver for initiating the contact with the first broadcast source by sending a communications session request via a communications network to the first broadcast source including a first contact identifier associated with the first broadcast source, wherein the media device uses at least a portion of the received broadcast media data associated with the received broadcast media from the first broadcast source to retrieve the first contact identifier from a media server.

2. The device of claim 1, wherein at least one contact identifier is provided by the user to the data store via the user interface.

3. The device of claim 1, wherein the broadcast media data includes at least one contact identifier.

4. The device of claim 3, wherein the at least one contact identifier is provided via the received media data to the data store.

5. The device of claim 1, wherein the transceiver is operable for: i) sending a query to the media data server via a data network for the first contact identifier associated with the first broadcast source, ii) retrieving the first contact identifier via the data network, and iii) providing the first contact identifier to the data store.

6. The device of claim 1, wherein the user interface includes at least one of a display, a keypad, a touch screen, a clickwheel, a touch pad, a speaker, and a microphone.

7. The device of claim 1, wherein the first broadcast source includes a radio station.

8. The device of claim 1, wherein the first contact identifier includes at least one of a telephone number, an IP address, a domain name, and a URL.

9. The device of claim 1, wherein the at least a portion of the received broadcast media data comprises at least one of an IP address, a domain name, and a URL.

10. A method for initiating contact with a broadcast source from a media device comprising:
 receiving broadcast media and associated broadcast media data from a plurality of broadcast sources using a broadcast receiver of the media device, the broadcast receiver being tunable to a first broadcast source,
 storing a list of contact identifiers in a data store of the media device, each contact identifier being associated with one of the plurality of broadcast sources,
 providing a prompt with the media device to a user to enable the user to initiate contact with the first broadcast source,
 receiving a user indication with the media device to initiate contact with the first broadcast source,
 using at least a portion of the broadcast media data received from the first broadcast source to retrieve with the media device a first contact identifier from a media server, and
 initiating the contact with the first broadcast source by sending a communications session request from the media device to the first broadcast source including the retrieved first contact identifier associated with the first broadcast source.

11. The method of claim 10, wherein at least one contact identifier is provided by the user to the data store via the user interface.

12. The method of claim 10, wherein the broadcast media data includes at least one contact identifier.

13. The method of claim 12, wherein the at least one contact identifier is provided via the received broadcast media data to the data store.

14. The method of claim 10 comprising:
 i) sending a query from the media device to the media data server for the first contact identifier associated with the first broadcast source,
 ii) retrieving at the media device the first contact identifier via a data network, and
 iii) providing the retrieved first contact identifier to the data store.

15. The method of claim 10, wherein providing a prompt and receiving a user indication are via a user interface of the media device, the user interface including at least one of a display, a keypad, a touch screen, a clickwheel, a touch pad, a speaker, and a microphone.

16. The method of claim 10, wherein the first broadcast source includes a radio station.

17. The method of claim 10, wherein the first contact identifier includes at least one of a telephone number, an IP address, a domain name, and a URL.

18. The method of claim 10, wherein the at least a portion of broadcast media data comprises at least one of an IP address, a domain name, and a URL.

* * * * *